(12) United States Patent
Hamelink et al.

(10) Patent No.: US 6,484,622 B1
(45) Date of Patent: Nov. 26, 2002

(54) VARIABLE OIL RING TENSION MECHANISM

(75) Inventors: Joseph C. Hamelink, N. Muskegon; David R. Stamy, Twin Lake, both of MI (US)

(73) Assignee: Dana Corporation, Toledo, OH (US)

( * ) Notice: Subject to any disclaimer, the term of this patent is extended or adjusted under 35 U.S.C. 154(b) by 19 days.

(21) Appl. No.: 09/809,652

(22) Filed: Mar. 15, 2001

(51) Int. Cl.$^7$ .................................................. F16J 1/06
(52) U.S. Cl. .......................... 92/201; 92/207; 277/470; 277/486
(58) Field of Search .................... 92/187, 197, 199, 92/201, 207; 277/470, 486

(56) References Cited

U.S. PATENT DOCUMENTS

| | | | |
|---|---|---|---|
| 194,746 A | 8/1877 | Walker | |
| 742,097 A | 10/1903 | Officer | |
| 1,280,708 A | 10/1918 | Gibson | |
| 2,343,942 A | * 3/1944 | Teetor | ................ 277/486 |
| 2,854,301 A | 9/1958 | Lutz | |
| RE32,395 E | 4/1987 | Geffroy et al. | |
| 4,926,811 A | * 5/1990 | Parsons | ................ 92/201 |

* cited by examiner

*Primary Examiner*—F. Daniel Lopez
(74) *Attorney, Agent, or Firm*—Radar, Fishman & Grauer, PLLC

(57) ABSTRACT

A variable oil ring compression mechanism provides for real-time cyclic variation of piston ring tension in an operating internal combustion engine. A cam is situated in the gap of a piston oil control ring, the cam affixed to a shaft secured to a pivot plate positioned within the body of the piston, wherein the pivot plate is adapted to oscillate in a follower-style rocking motion responsive to the rotary movement of a connecting rod boss positioned in close proximity with the plate. In a preferred form, the cam is situated between ends of an expander ring positioned between oil scrapper rails in the bottom groove of the piston.

9 Claims, 1 Drawing Sheet

VARIABLE OIL RING TENSION MECHANISM

BACKGROUND OF THE INVENTION

1. Field of Invention

This invention relates to pistons of internal combustion engines, and more particularly to enhancement of the piston rings employed in such pistons.

2. Description of the Prior Art

Those skilled in the art will appreciate that the pistons of internal combustion engines in today's modern vehicles are generally provided with three sets of piston rings for preventing, between the pistons and cylinder bores, leakage of gas to the crankcase, or of oil to the piston head.

As a practical matter, it is well known that the piston rings of modern engines, although substantially improved over engines of prior vintage, are in some ways still lacking. For example, the upper compression ring is designed for one hundred percent sealing of the gases of combustion to prevent entry into the engine crankcase. Generally the lower compression ring provides only about forty percent of the noted gas sealing function, and approximately sixty percent of an oil scrapping function. The latter prevents oil from traveling up to the top of the piston head to create the classic smoking tailpipe or "blue smoke" syndrome. Finally, most modern pistons includes a bottom oil control ring that includes at least one rail used for aggressive scrapping of oil to force same back into the crankcase. Normally sharing the bottom piston ring groove with the at least one rail is an expander ring formed of an undulating, sinusoidal-shaped spring steel for the purpose of loading the rail appropriately, so that the rail may be effective in its scrapping function as the piston reciprocates within its cylinder bore. Hence the combination of the rail and the expander is referred to as an oil control ring.

It will thus be appreciated that various piston rings have unique design functions for addressing either of the noted prevention of leakage of gas to the crankcase, or of oil to the piston head. Generally, as the rings wear during their continuous scrapping against the cylinder walls and associated rocking within piston ring grooves, issues of blow-by of gases into the crankcase, and oil leakage into combustion chamber areas, become significant. Most rings incorporate a tangential tension in their initial structure which can generate approximately eight pounds of force (as measured by a spring band) against the cylinder walls. Unfortunately, this force does not vary, and tends to apply same pressure on both upward and the downward strokes of the piston.

Particularly with respect to the scrapper function of the bottom oil control ring, a variable oil ring compression control against the cylinder walls would be quite desirable.

SUMMARY OF THE INVENTION

The present invention provides a mechanism designed to maximize radial pressure of a piston oil control ring against the cylinder wall of a cylinder bore on the downward or power stroke of the piston. Conversely, the same mechanism minimizes the pressure on the upward stroke. For this purpose, a cam is positioned between the gap of the expander ring of the bottom control ring in the piston. The cam oscillates in response to the cyclic movement of the piston connecting rod. A shaft is rigidly affixed to the cam, and is secured to a pivot plate located within the body of the piston. The pivot plate oscillates in a rocking motion in response to a paddle slapping motion induced by the oscillatory/rotary movement of the connecting rod. The cam is positioned to reciprocally expand and contract the expander ring during the power stroke cycle. As a result, the radial pressure of the ring increases and decreases against the cylinder wall as the piston reciprocates within the cylinder. Minimizing and maximizing the normally constant radial ring pressure during the piston upstroke and downstroke, respectively, will minimize oil consumption and increase fuel economy.

DETAILED DESCRIPTION OF THE PREFERRED EMBODIMENTS

Figure 1:
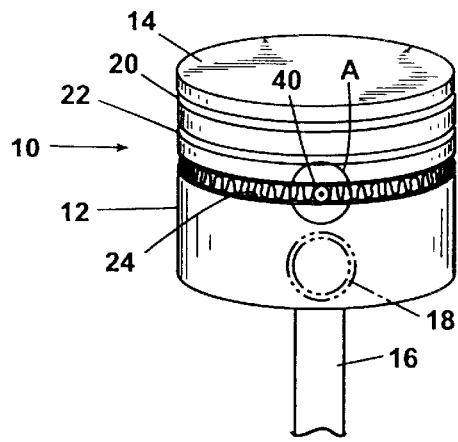
FIG. 1 is a perspective view of a piston which incorporates the variable oil ring compression mechanism of the present invention.
Figure 2:
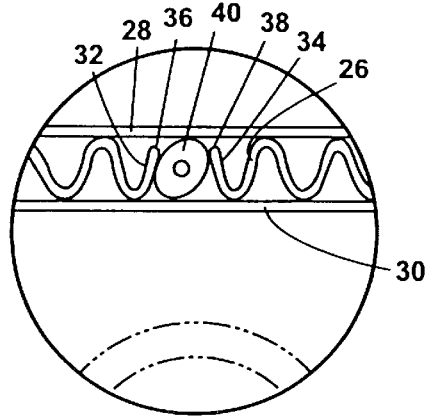
FIG. 2 is an enlarged view of inset A of FIG. 1 to show details of an oscillatory cam employed in one presently preferred embodiment of this invention.

Referring to FIGS. 1 and 2, this invention presents a variable oil ring compression mechanism for maximizing radial pressure of an engine piston ring against an associated engine cylinder wall on the downward stroke of a piston assembly. Conversely, upon the upstroke of the piston assembly, the pressure is reduced. Thus, in FIG. 1, a piston 10 includes a cylindrical skirt body portion 12. The piston has a head or dome 14 and a connecting rod 16 secures the piston 10 for reciprocal motion in a cylinder bore (not shown). The connecting rod 16 is connected to the piston 10 by way of a piston pin 18. The opposite end of the connecting rod 16 (not shown) is connected to an engine crankshaft, (not shown). The rod 16 converts rotary motion of the crankshaft into linear reciprocal motion of the piston 10.

A top ring groove 20 in the skirt body portion 12 of the piston 10 is adapted to retain a compression ring (not shown) which acts as a gas sealing medium to avoid admission of gases into the crankcase during reciprocal motion of the piston. A second lower ring groove 22 accommodates a second compression ring (not shown) which operates in concert with the top ring to facilitate the gas sealing function. However, the bottom compression ring is normally only 40 percent effective to seal gases, and works in concert with a bottom oil control ring with respect to 60 percent of its function, i.e. oil scrapping, so as to avoid admission of oil into the combustion chamber. To the extent that neither of the noted compression rings which fit into grooves 20 and 22 are germane to this invention, they are not shown. Their details are provided herewith as background, only.

Working in concert as noted with the bottom compression ring, however, are a pair of oil scrapper rails 28 and 30, and an expander ring 26 positioned between the rails within a bottom groove 24. Referring now specifically to FIG. 2, it will be appreciated by those skilled in the art that a rotary cam 40 may be installed to oscillate between opposed ends 32 and 34 of the expander ring 26. It will be appreciated by those skilled in the art that the extremities 36 and 38 of the ring ends 32 and 34, respectively, must be rounded and polished so as to avoid interference with rotary movements of the cam 40. Indeed the cam should not establish physical contact directly within the extremities of the ends at any point in the oscillatory cycle of the cam.

To the extent that today's engines rotate at speeds approaching 5000 to 6000 revolutions per minute, it is imperative that the expander be of a relatively high grade material having a superior capability for avoiding wear. For this purpose, normally high grade stainless steel materials used for expanders can be nitrided, as for example by plasma coating. Other hardening means are contemplated to fall within the scope of the present invention.

The invention further contemplates a movement or rotation of the cam 40 so as to produce a maximal gap spacing between the ends 32 and 34 of the expander 26 at peak velocity, i.e., during downward or power stroke movement of the piston. Assuming the radial piston ring load is maximized upon the power stroke, the remaining cyclic conditions of pressure on the cylinder walls will be less than maximum. As a result, fuel efficiency can be realized because average value of friction on the walls will be less than afforded by today's state-of-the-art constant piston rings. In one preferred embodiment, the total amount of spaced apart defection of the expander ends will be in the range of one hundred thousandth of an inch, or approximately up to eighth of an inch.

Figure 3:
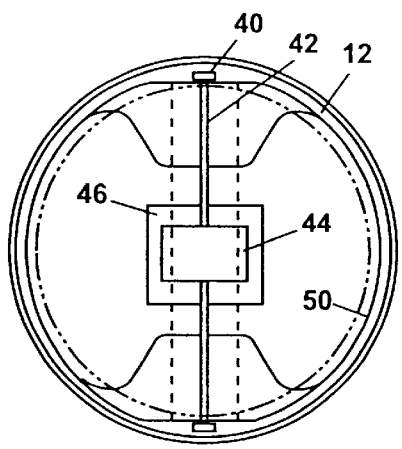
FIG. 3 is a view along lines 3—3 of FIG. 4
Figure 4:
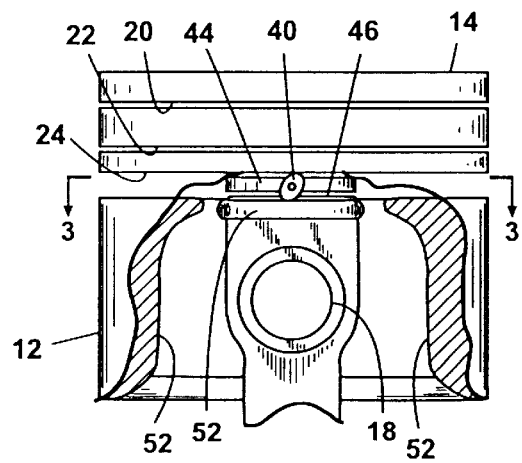
FIG. 4 is a view of an elevation of the piston of FIG. 1 shown in cut-a-way form to reveal the interaction between a pivot plate employed in the present invention and the top of the connecting rod boss.

Referring now to FIGS. 3 and 4, it will be apparent that the cam 40 is rigidly secured to a rotary shaft 42. The shaft 42 is, in turn connected to a pivot plate 44 which moves in close association with a connecting rod boss 46. Thus, as the connecting rod moves during the engine cycle the pivot undergoes essentially a paddle-slapping follower movement induced by the connecting rod boss 46.

This design contemplates virtually little or no modification of most existing piston structures. For example, in FIGS. 3 and 4 it will be appreciated that the interior wall 50 of the piston 10 includes integral embossments 52 which reinforce the piston walls for strength. This invention contemplates that the walls 50 and associated skirt body portion 12 will fully accommodate installation of the variable oil ring compression mechanism described.

The above description is intended to be illustrative and not limiting. Therefore, the scope of the invention should be determined, however, not with reference to the above description, but with reference to the appended claims along with the full scope of equalivents to which such claims may be entitled.

What is claimed is:

1. An apparatus for optimizing radial pressure of an engine piston ring against an associated engine cylinder wall on the downward stroke of an associated piston assembly comprising:

a) a cylindrical piston adapted for reciprocal movement within an engine cylinder bore; said piston secured to a connecting rod adapted to cause the piston to reciprocate within said cylinder bore, said piston having at least one ring groove circumferentially disposed about its exterior side wall;

b) the engine piston ring is a circumferential resilient annular piston ring disposed within said piston ring groove, said piston ring being discontinuous, and defining first and second ends adapted to be circumferentially spaced apart to form a gap;

c) a cam disposed within said gap, said cam being resiliently angularly moveable within said gap against said first and second ends of said piston ring;

d) a pivot shaft disposed diametrically across the interior of said piston, one end of the pivot shaft extending through and supported by an interior piston wall, said end being rigidly affixed to said cam, the other end supported within an opposed interior wall of said piston; and e) a pivot plate rigidly affixed to said pivot shaft intermediate said supported ends thereof, said plate being adapted to oscillate about the axis of said pivot shaft as a function of cyclic rotary movement of said connecting rod, whereby said resultant oscillation of said cam urges the first and second ends of said piston ring apart as a cyclic function of reciprocal piston movement to increase said radial pressure against said cylinder wall upon said downward stroke of said piston.

2. The apparatus of claim 1 wherein the oscillatory movement of said cam is effective to reduce said radial pressure of said piston ring against said engine cylinder wall upon the upward stroke of said piston.

3. The apparatus of claim 2 wherein said oscillatory movement of said cam is effective to produce a real-time cyclic variation of said radial pressure, whereby oil consumption and fuel economy is optimized.

4. The apparatus of claim 3 wherein said piston ring is formed of a spring steel.

5. The apparatus of claim 4 wherein said piston ring is an expander ring having an axially corrugated circumference to define sinusoidal-like undulations forming the circumference thereof.

6. The apparatus of claim 5 wherein said oscillatory cam motion is effective to produce maximal radial pressure on said downward stroke to thereby produce a maximum oil scraping force between the expander ring and the engine cylinder wall during said stroke.

7. The apparatus of claim 6 wherein said first and second ends of said expander ring have extremities which are adapted to remain out of direct physical contact with said oscillatory cam in the entire range of movement of said cam.

8. The apparatus of claim 7 wherein said piston comprises a plurality of ring grooves circumferentially disposed about its exterior side wall, and wherein said expander ring is situated in a bottom-most of said grooves of said piston.

9. The apparatus of claim 8 wherein said expander ring is disposed within said bottom-most groove, and wherein said bottom-most groove further comprises a top rail situated above said expander ring, and a bottom rail situated below said expander ring.

\* \* \* \* \*